(12) United States Patent
Decker

(10) Patent No.: US 10,352,815 B2
(45) Date of Patent: Jul. 16, 2019

(54) LEAKAGE TESTING DEVICE FOR ATTACHMENT TO A FLEXIBLE WALL OF AN ITEM TO BE TESTED

(71) Applicant: Inficon GmbH, Cologne (DE)

(72) Inventor: Silvio Decker, Cologne (DE)

(73) Assignee: INFICON GMBH, Cologne (DE)

( * ) Notice: Subject to any disclaimer, the term of this patent is extended or adjusted under 35 U.S.C. 154(b) by 0 days.

(21) Appl. No.: 14/436,191

(22) PCT Filed: Oct. 2, 2013

(86) PCT No.: PCT/EP2013/070556
§ 371 (c)(1),
(2) Date: Apr. 16, 2015

(87) PCT Pub. No.: WO2014/060213
PCT Pub. Date: Apr. 24, 2014

(65) Prior Publication Data
US 2015/0276543 A1    Oct. 1, 2015

(30) Foreign Application Priority Data

Oct. 18, 2012 (DE) .......................... 10 2012 219 047

(51) Int. Cl.
G01M 3/00 (2006.01)
G01M 3/32 (2006.01)
G01M 3/02 (2006.01)
G01M 3/22 (2006.01)

(52) U.S. Cl.
CPC .......... *G01M 3/3218* (2013.01); *G01M 3/007* (2013.01); *G01M 3/027* (2013.01); *G01M 3/227* (2013.01)

(58) Field of Classification Search
USPC .................................................. 73/1.16, 1.25
See application file for complete search history.

(56) References Cited

U.S. PATENT DOCUMENTS

| 6,167,890 B1 * | 1/2001 | Gueret | A45D 40/00 132/200 |
| 6,634,215 B1 * | 10/2003 | Nothhelfer | G01M 3/227 73/38 |
| 2006/0144120 A1 * | 7/2006 | Tang | G01M 3/007 73/1.17 |
| 2007/0209959 A1 * | 9/2007 | Burgess | B65D 75/5838 206/494 |
| 2010/0038380 A1 * | 2/2010 | Compton | B65D 75/5877 222/105 |

(Continued)

FOREIGN PATENT DOCUMENTS

| DE | 29 26 112 A1 | 1/1981 |
| EP | 1 119 755 B1 | 11/2002 |
| EP | 2 447 694 A1 | 5/2012 |

(Continued)

*Primary Examiner* — Son T Le
*Assistant Examiner* — Alexander A Mercado
(74) *Attorney, Agent, or Firm* — Kirton & McConkie; Lloyd Metcalf

(57) ABSTRACT

An improved leakage testing device for attachment to a flexible wall of an item to be tested is provided with a film (4) that limits a hollow chamber (1) on the outer side of the item to be tested and with a leakage (2), said film (4) being designed to adhere to the item to be tested.

4 Claims, 1 Drawing Sheet

(56) References Cited

U.S. PATENT DOCUMENTS

| | | | |
|---|---|---|---|
| 2011/0226043 A1* | 9/2011 | FIrpo | G01M 3/207 73/40 |
| 2015/0144141 A1* | 5/2015 | Mo | A61F 6/005 128/844 |

FOREIGN PATENT DOCUMENTS

| | | |
|---|---|---|
| JP | 2002-527738 A | 8/2002 |
| WO | 2010/032201 A1 | 3/2010 |

* cited by examiner

LEAKAGE TESTING DEVICE FOR ATTACHMENT TO A FLEXIBLE WALL OF AN ITEM TO BE TESTED

This application is a National Stage of International Application No. PCT/EP2013/070556, filed Oct. 2, 2013, and entitled LEAKAGE TESTING DEVICE FOR ATTACHMENT TO A FLEXIBLE WALL OF AN ITEM TO BE TESTED, which claims the benefit of DE 10 2012 219 047.3, filed Oct. 18, 2012. This application claims priority to and incorporates herein by reference the above-referenced applications in their entirety.

The invention relates to a leakage testing device for attachment to the outside of an item to be tested.

Test leakages find application in the testing or the calibration of leak test systems with which items to be tested are tested for tightness. Typically, the items to be tested are packages for food, pharmaceuticals or sterilely packaged objects used in the field of medicine. Leak testing is used to detect leakages in a package that may result in the spoilage of the packaged product. The item to be tested for tightness has a thin wall that forms the package of the product. The leak test is performed in an automated manner using leak test systems. With consideration to the fact that even small leakages in an item to be tested can cause the spoiling of the packaged products, the leak test systems have to be able to detect small leakages with high reliability. The leak test systems have to be tested at regular intervals and have to be calibrated, if necessary. For this purpose, test leakages are used that are provided on the outside of the item to be tested.

From EP 1 119 755 B1 it is known to provide the wall of an item to be tested with a re-sealable patch leak permeable to test gas. The patch leak has a circumferential adhesive edge by which it is stuck on the outer side of the item to be tested. The patch leak closes an intentionally made hole in the item to be tested and forms a defined leakage. Outside the item to be tested, test gas can be detected that escapes from inside the item to be tested to the outside via the patch leak.

It is an object of the present invention to provide an improved test leakage that allows for a non-destructive testing of a package in a production line.

The leakage testing device of the present invention is defined by the features of claim 1.

The leakage testing device is provided with a film and an adhesive film. Using the adhesive film, the leakage testing device can be stuck on the outer side of the item to be tested. A cavity is formed between the film and the adhesive film. In the region of the cavity, the film is provided with a defined leakage. The cavity contains a test gas that escapes via the leakage and can be detected by a leak test system. In this manner, the device forms a test leakage and offers the advantage that the item to be tested is not destroyed by providing it with a test leakage. The test leakage is merely stuck on the outer side of the item to be tested and contains a defined quantity of a test gas that escapes through the leakage at a predetermined leakage rate. For testing or calibrating a leak test system, the leakage testing device of the present invention can be stuck on the item typically to be tested with the leak test system, without damaging the same. The item to be tested is then supplied to the leak test system and the leak test system can be tested and calibrated with the help of the leakage testing device.

In this regard, it is particularly advantageous if the adhesive film and the film are made of a flexible, shape-changing material, specifically of the packaging material of the item to be tested, or of a material that is at least similar thereto. This has the advantage that the leak test system to be tested or calibrated is loaded with an item to be tested which is of the usual size, shape and nature.

Preferably, a reinforcing device, e.g. in the form of a ring or an open-pore foamed material, is provided in the cavity between the film and the adhesive film. The reinforcing device serves to space the film from the adhesive film and to provide a stable cavity for the test gas. If a ring is used, the leakage should be provided in the area of the opening of the ring, e.g. on the central longitudinal axis of the ring or concentric to the same. With an open-pore foamed material as the reinforcing element, the same receives the test gas and at the same time increases the stability. As an alternative to an open-pore foamed material, any material storing air or test gas can be used, which provides the cavity with the required stability. The volume of the cavity may be of a size so small that it is just sufficient for one test or that it can be used for several tests.

Using the adhesive film, the leakage testing device is stuck onto the outer side of the item to be tested. Advantageously, the adhesive film and the film are made of a flexible material. The leakage testing device may then be stuck on in the manner of a plaster. As an alternative, the leakage testing device may also be rigid. After testing, the test leakage can be removed from the item to be tested, without damaging the same.

The leakage of the leakage testing device may be in the form of a small hole in the film having a diameter of less than one millimeter. As an alternative, the leakage can be designed as an adjustable aperture with a variable diameter of one millimeter at most or as a permeable film.

The following is a detailed description of an embodiment of the present invention with reference to the Figures.

Figure 1:
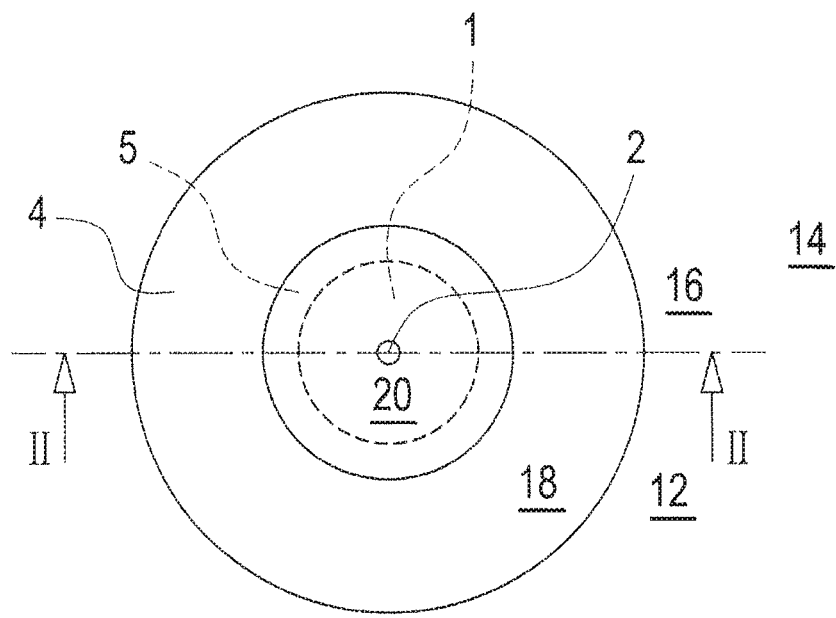
FIG. 1 is a top plan view.
Figure 2:
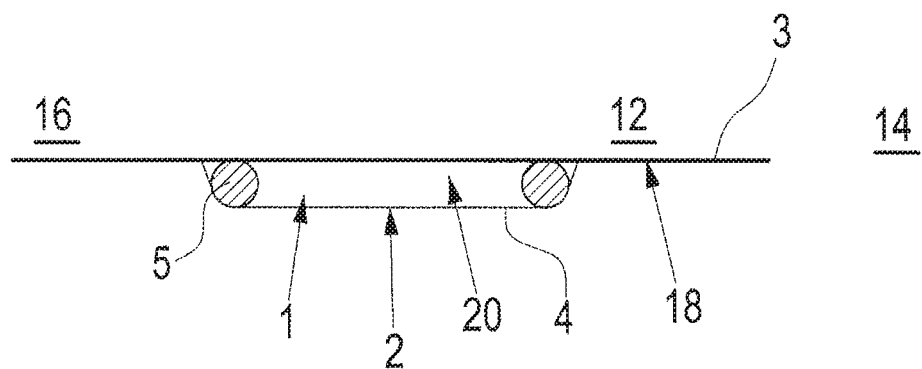
FIG. 2 is a sectional view of the leakage testing device along line II-II in FIG. 1.

The leakage testing device comprises a film 4, an adhesive film 3 and a reinforcing device 5, and forms a test leakage. The film 4 and the adhesive film 3 are of circular shape with equal outer diameters.

The film 4 lies on the adhesive film 3 and is fixedly joined thereto at the edge portion 18 thereof. In an area arranged concentrically about the center portion 20 of the film and around the adhesive film 3, the film is not joined to the adhesive film 3 and forms a cavity 1 together with the latter. At its centre, the film 4 is provided with a leakage 2 in the form of a small hole having a diameter of less than one millimeter. The leakage 2 provides access to the cavity 1 so that test gas contained in the cavity 1 can escape through the leakage 2 and can be detected by a leak test system. In the region of the outer edge of the cavity 1, the reinforcing element 5 is provided therein in the form of a ring that spaces the film 4 from the adhesive film 3 and thereby creates a stable cavity 1. This reduces the risk of the film sticking to the adhesive film 3 and thereby changing the outflow characteristics of the test gas through the leakage 2.

On the side opposite the film 4, the adhesive film 3 is provided with an adhesive layer of the type of an adhesive tape or plaster.

Using this adhesive layer, the test leakage can be stuck on the outer side 12 of a flexible wall 16 of an item 14 to be tested, without damaging the same.

The invention claimed is:

1. A test leak device for attachment to a flexible wall of an item to be tested, comprising:

a first film which defines a cavity on the outer side of the item to be tested, and is provided with a hole configured to simulate a gas leak in the flexible wall of the item to be tested for gas leakage; and a second film, wherein the second film comprises an adhesive and is designed to be stuck onto the item to be tested, wherein the first film lies on the second film, wherein the second film is fixedly joined to an end portion of the first film, wherein the end portion of the first film entirely surrounds a center portion of the second film, wherein the center portion of the second film is not joined to the first film, the first film thereby forming a cavity together with the second film, wherein except for the hole, the cavity is encapsulated, enclosed, and defined entirely by the center portion and the first film.

2. The test leak device of claim 1, wherein a reinforcing element is enclosed within the cavity, which element spaces the first film from the second film in the area of the cavity.

3. The test leak device of claim 1, wherein the cavity is encapsulated by the first and second films prior to attachment of the test leak device to the flexible wall.

4. A method for testing or calibrating a leak test system with which items are to be tested for tightness, the method comprising:

filing a cavity of a test leak device with a test gas, wherein the test leak device comprises:

a first film which defines the cavity on the outer side of the item to be tested, and is provided with a hole configured to simulate a gas leak in a flexible wall of the item to be tested for gas leakage; and a second film, wherein the second film comprises an adhesive and is designed to be stuck onto the item to be tested, wherein the first film lies on the second film, wherein the second film is fixedly joined to an end portion of the first film, wherein the end portion of the first film entirely surrounds a center portion of the second film, wherein the center portion of the second film is not joined to the first film, the first film thereby forming a cavity together with the second film, wherein except for the hole, the cavity is encapsulated, enclosed, and defined entirely by the center portion and the first film;

attaching the test leak device to the flexible wall of the item to be tested for the gas leakage;

escaping the test gas contained within the cavity through the hole at a predetermined leakage rate; and measuring the escaping test gas with the leak test system.

\* \* \* \* \*